United States Patent
Duda

(10) Patent No.: US 11,899,593 B2
(45) Date of Patent: Feb. 13, 2024

(54) METHOD AND APPARATUS FOR DETECTING ATS-BASED DMA ATTACK

(71) Applicant: Intel Corporation, Santa Clara, CA (US)

(72) Inventor: Przemyslaw Duda, Gdansk (PL)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 17/557,363

(22) Filed: Dec. 21, 2021

(65) Prior Publication Data

US 2022/0114107 A1 Apr. 14, 2022

(51) Int. Cl.
| | |
|---|---|
| G06F 12/1081 | (2016.01) |
| G06F 12/02 | (2006.01) |
| G06F 12/14 | (2006.01) |
| G06F 13/42 | (2006.01) |
| G06F 13/16 | (2006.01) |

(52) U.S. Cl.
CPC ...... *G06F 12/1081* (2013.01); *G06F 12/0238* (2013.01); *G06F 12/1425* (2013.01); *G06F 13/1673* (2013.01); *G06F 13/4221* (2013.01)

(58) Field of Classification Search
CPC .................................................. G06F 12/1081
USPC ........................................................ 711/206
See application file for complete search history.

(56) References Cited

U.S. PATENT DOCUMENTS

| | | | |
|---|---|---|---|
| 7,907,604 B2* | 3/2011 | Boyd | G06F 13/4022 370/359 |
| 9,684,618 B2* | 6/2017 | McGlone | G06F 1/3278 |
| 2006/0075146 A1* | 4/2006 | Schoinas | G06F 12/1009 710/22 |

(Continued)

FOREIGN PATENT DOCUMENTS

| | | |
|---|---|---|
| CN | 116305332 A | 6/2023 |
| EP | 3298498 B1 | 3/2019 |
| EP | 4202701 A1 | 6/2023 |

OTHER PUBLICATIONS

Extended European Search Report for EP Application No. 22204296.2, dated Apr. 18, 2023, 9 pages.

(Continued)

*Primary Examiner* — Titus Wong
(74) *Attorney, Agent, or Firm* — JAFFERY WATSON MENDONSA & HAMILTON LLP

(57) ABSTRACT

Embodiments are directed to providing a secure address translation service. An embodiment of a system includes a computer-readable memory for storage of data, the computer-readable memory comprising a first memory buffer and a second memory buffer, an attack discovery unit device comprising processing circuitry to perform operations, comprising, receiving a direct memory access (DMA) request from a remote device via a Peripheral Component Interconnect Express (PCIe) link, the direct memory access (DMA) request comprising a host physical address and a header indicating that the target memory address has previously been translated to a host physical address (HPA), and (Continued)

blocking a direct memory access in response to a determination of at least one of that the remote device has not obtained a valid address translation from a translation agent, or that the remote device has not obtained a valid translation for the target memory address from the translation agent.

21 Claims, 6 Drawing Sheets

(56) References Cited

U.S. PATENT DOCUMENTS

| | | | | |
|---|---|---|---|---|
| 2006/0236063 A1* | 10/2006 | Hausauer | ............ | G06F 12/1081 |
| | | | | 711/170 |
| 2006/0277348 A1* | 12/2006 | Wooten | ............... | G06F 12/1027 |
| | | | | 711/E12.067 |
| 2007/0266179 A1* | 11/2007 | Chavan | ............... | G06F 13/4022 |
| | | | | 709/250 |
| 2008/0080491 A1* | 4/2008 | Saripalli | ............. | G06F 12/1081 |
| | | | | 370/378 |
| 2008/0209160 A1* | 8/2008 | Katz | ..................... | G06F 11/263 |
| | | | | 711/206 |
| 2008/0222663 A1* | 9/2008 | Carpenter | ............. | G06F 12/145 |
| | | | | 726/1 |
| 2009/0144508 A1* | 6/2009 | Freimuth | ............ | G06F 12/1081 |
| | | | | 710/25 |
| 2009/0164694 A1* | 6/2009 | Talayco | ............... | G06F 13/4022 |
| | | | | 710/316 |
| 2010/0332694 A1* | 12/2010 | Sharp | .................... | G06F 13/385 |
| | | | | 710/62 |
| 2013/0019108 A1* | 1/2013 | Auernhammer | .......... | H04L 9/00 |
| | | | | 713/190 |
| 2015/0378930 A1* | 12/2015 | Sahita | ................. | G06F 9/45558 |
| | | | | 711/207 |
| 2016/0077976 A1* | 3/2016 | Raikin | .................... | G06F 13/28 |
| | | | | 711/207 |
| 2016/0140074 A1* | 5/2016 | Lee | ....................... | G06F 13/404 |
| | | | | 710/313 |
| 2017/0149920 A1* | 5/2017 | Sammatshetti | ......... | G06F 3/061 |

OTHER PUBLICATIONS

Intel: "Intel® Virtualization Technology for Directed I/O Architecture Specification" Sep. 1, 2007 (Sep. 1, 2007), XP055574662, Retrieved from the Internet: URL:http://kib.kiev.ua/x86docs/SDMs/D51397-003.pdf.

* cited by examiner

US 11,899,593 B2

METHOD AND APPARATUS FOR DETECTING ATS-BASED DMA ATTACK

TECHNICAL FIELD

Embodiments described herein generally relate to the field of memory address translation and memory protection and, more particularly to a method and apparatus for detecting an Address Translation Service (ATS) based direct memory access (DMA) attack.

BACKGROUND

Address Translation Services (ATS) is an extension to the PCIe protocol. The current version of ATS is part of the PCIe specification, currently 4.0, which is maintained by the PCI Special Interest Group (PCI-SIG) which may be referred to herein as the "ATS Specification." An ATS-enabled device may cache address translations between a host address domain and a device address domain. In such an ATS-enabled configuration, a system may utilize Address Translation Caches (ATC) of capable devices to increase the performance by effectively increasing size of the system ATC. In some examples, devices with ATS capability may provide address translations to the host device. This may present a security threat as such translations may bypass IOMMU memory access protections.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
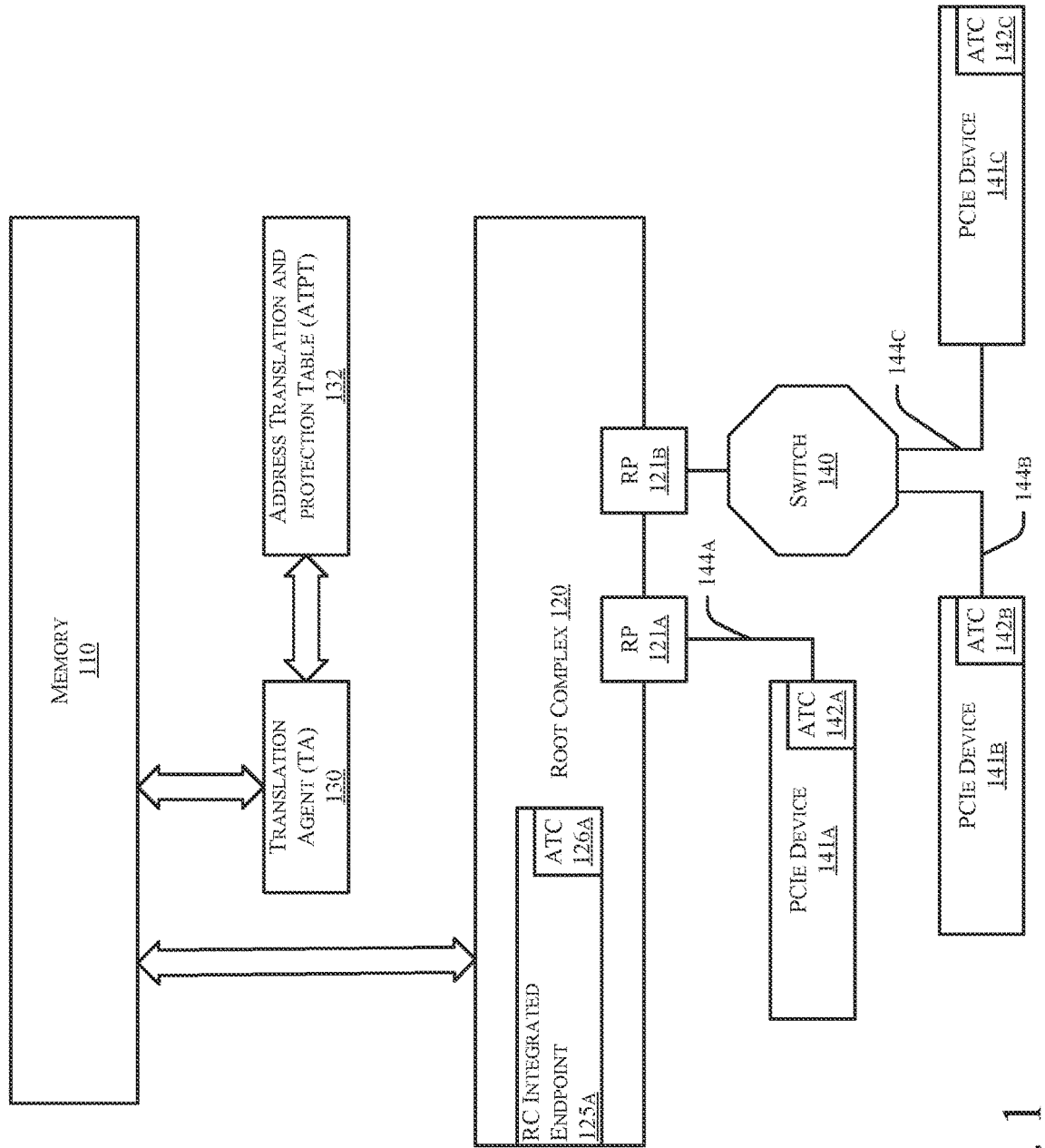
FIG. 1 is a block diagram illustrating components of a computing environment in which a method for detecting an ATS-based DMA attack may be implemented, in accordance with an embodiment.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Most modern computer systems use some form of memory virtualization for optimal memory usage and security. Traditionally, Peripheral Component Interconnect Express (PCIe) devices only observe untranslated addresses, instead of a Host Physical Addresses (HPA), and would therefore send a read or write request to a host device with a given untranslated address. On the host side, the processor's input/output memory management unit (IOMMU) would receive a read/write request from a PCIe device, translate the target address to a host physical address (HPA), and then complete the memory access request (e.g., read/write). In order to isolate devices only to specific addresses, software would program the PCIe device and the IOMMU to use untranslated address that are, for example, a Virtual Addresses (VA) or an Input/Output Virtual Address (IOVA). The HPA is the physical address used to access all platform resources, after all address translations have taken place, including any translation from Guest Physical Address (GPA) to HPA in a virtualized environment, and may be referred to simply as a Physical Address (PA) in a non-virtualized environment.

Address Translation Services (ATS) is an extension to the PCIe protocol. The current version of ATS is part of the PCIe specification, currently 4.0, which is maintained by the PCI Special Interest Group (PCI-SIG) which may be referred to herein as the "ATS Specification." An ATS-enabled device may cache address translations between a host address domain and a device address domain. In such an ATS-enabled configuration, a system may utilize Address Translation Caches (ATC) of capable devices to increase the performance by effectively increasing size of the system ATC. In some examples, devices with ATS capability may provide address translations to the host device. This may present a security threat as such translations may bypass IOMMU memory access protections.

To address these and other issues, described herein are methods and apparatus for detecting an ATS-based direct memory access (DMA) attack. In some examples, an attack discovery unit device (ATD) may be instantiated in a PCIe root complex to facilitate detecting ATS-based direct memory access (DMA) attacks originating from PCIe devices. The attack discovery unit device maintains a first table in memory that records data that uniquely identifies each PCIe device that has obtained a valid memory address translation from a translation agent (TA) and a second table that uniquely identifies each PCIe device and both the target address and translated address for a valid memory address translation from the translation agent. When a PCIe device initiates a direct memory access, the attack discovery unit utilized the tables in the memory to determine whether the direct memory access request constitutes an attack, either by a malicious device (i.e., a device which is not authorized to access memory of the host system), or by a device which may be authorized, but seeks to access a region of memory which the device is not authorized to access. Details of the methods and apparatus are described with reference to FIG. 1 through FIG. 6, below.

Example Computing Environment

FIG. 1 is a block diagram illustrating components of a computing environment 100 in which a method for detecting an ATS-based DMA attack may be implemented, in accordance with an embodiment. In the context of the present example, the computing system includes a memory 110, a root complex (RC) 120, and a translation agent 130. Similar to a host bridge in a PCI system, the RC 120 generates transaction requests on behalf of the host system processor (s), which are coupled to the RC 120 through a local bus and facilitates processing of requests by devices 141a, 141b, 141c, which are coupled to the RC 120 via respective host-to-device links 142a-c, and root port (RP) 121a or switch 140 and RP 121b. In some examples, RC functionality may be implemented as a discrete device, or may be integrated with a processor.

ATS uses a request-completion protocol between devices 141a-c and the RC 120 to provide translation services. Non-limiting examples of devices 141a-c include a network interface card (NIC), a graphics processing unit (GPU), a storage controller, an audio card, and a solid-state drive (SSD) in the form of a peripheral (auxiliary) device or an integrated device. The basic flow of an ATS request (e.g., a translation request or a translated request) begins with a context (e.g., a process or a function) of a device (e.g., one of devices 141a, 141b, 141c) determining through an implementation-specific method that caching a translation within the device's address translation cache (ATC) 144a, 144b, 144c, for example, would be beneficial. The context (not shown) generates a translation request, which is sent upstream through the PCIe hierarchy (via host-to-device link 142b or 142c, switch 110, and RP 121b or via host-to device link 144a and RP 121a, depending upon the device 141a-141c with which the context is associated) to the RC 120, which then forwards the request to translation agent 130. Non-limiting examples of host-to-device link 142a-141c include a PCIe link or a cache-coherent link (e.g., CXL) that includes PCIe capabilities. When the translation agent 130 has completed processing associated with the ATS request, the translation agent 130 communicates the success or failure of the request to the RC 120, which generates an ATS completion and transmits it to the requesting device via the associated RP 121a or 121b.

As noted above, in accordance with the ATS Specification, translation agents perform various checks to among other things, validate the requesting device has been enabled by the system software to use ATS and that the HPA specified by a translated request is not part of a system protected range. In addition to these checks, which may be insufficient to protect against a malicious ATS device, in various embodiments, the translation agent 130 may provide an access control mechanism that ensures a context of a device can only access HPAs to which it has explicitly been assigned appropriate permissions.

In some instances, system software (e.g., an operating system and/or a virtual machine manager (VMM)) running on a host system can configure permissions (e.g., read and/or write access) for each page of memory 110 individually for each of devices 141a-141c. These permissions may be stored in memory as an address translation and protection table (ATPT) 132, (and may be referred to herein as page access permissions or page permissions), which may be maintained on behalf of system software by the translation agent 130 in a suitable memory location. For example, the ATPT, or portions thereof, may be stored in a variety of locations including, but not limited to on-chip memory (e.g., static random access memory (SRAM)), off-chip memory (e.g., DRAM), registers or an external storage device (not shown).

In some examples, the ATPT 132 may be represented as a flat table in memory 110 in which for every device associated with the host system that is desired to use secure ATS and for each page in main memory a corresponding permission entry containing page access permissions specifying appropriate read/write permissions can be created. Alternatively, to avoid pre-allocating a large memory space and take advantage of the small size of the permission entries, the ATPT 132 can be organized as a hierarchical table (similar to how address translation page tables are organized). In any implementations in which the ATPT 132 is stored off-chip, one or more optional, dedicated caches may be used to accelerate walking of the various levels of the ATPT 132.

Figure 2:
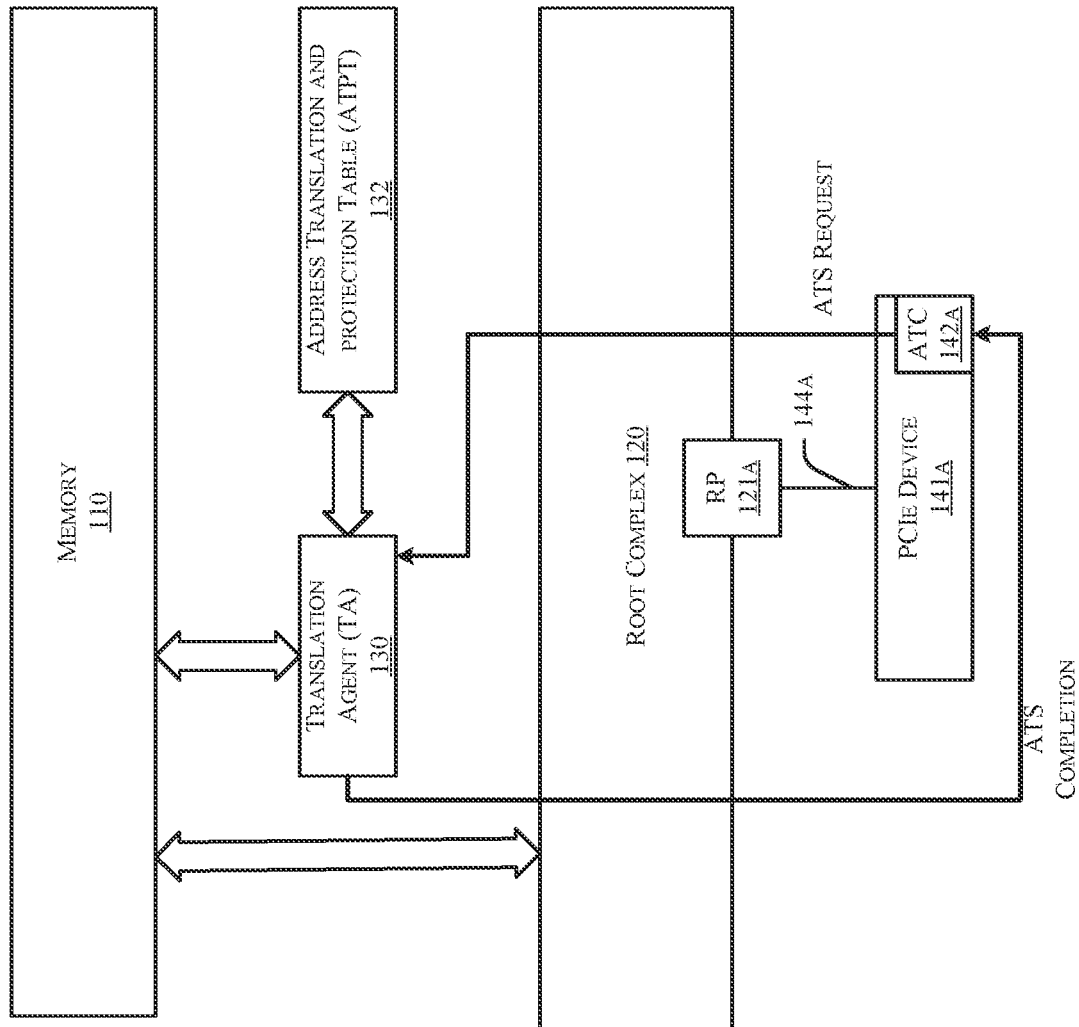
FIG. 2 is a block diagram illustrating data flows between components of a computing system in which a method for detecting an ATS-based DMA attack may be implemented, in accordance with an embodiment.

FIG. 2 is a block diagram illustrating data flows between components of a computing system 200 in which a method for detecting an ATS-based DMA attack may be implemented, in accordance with an embodiment. Referring to FIG. 2, in some examples a PCIe device 141a may comprise an address translation cache (ATC) 142a. As described above, when a PCIe device 141a originates a memory access request to the host system the request is routed through the root port 121a and the root complex 120 to the translation agent 130. In some examples the ATS request includes a transport layer protocol (TLP) header which comprises a Requester ID (RID), an untranslated address (i.e., a target address), and an address translation (AT) field. The AT field may be set to either a first value ("Untranslated") or a second value ("Translated"). The first value indicates that the target address has not yet been translated by the translation agent 130, and thus the services of translation agent 130 are required to process the ATS request. The translation agent 130 processes the request using the ATPT 132 and responds with an ATS completion message that includes the translated address retrieved from the ATPT 132.

When the AT field is set to the second value, the field indicates that the target address has already been translated to a host physical address (HPA) by the translation agent 130 and the ATPT 132. In this case the field indicates that the services of the translation agent 130 are not required for the ATS request, i.e., that the ATS request can be processed as a direct memory access (DMA) request to the memory 110. This presents a potential security threat when either: (a) a malicious device (i.e., a device that is not authorized to access memory 110) attempts a direct memory access to memory 110 by setting the AT field to the second value; or (b) an authorized device makes a malicious attempt to access a portion of the memory 110 that the device is not authorized to access.

Figure 3:
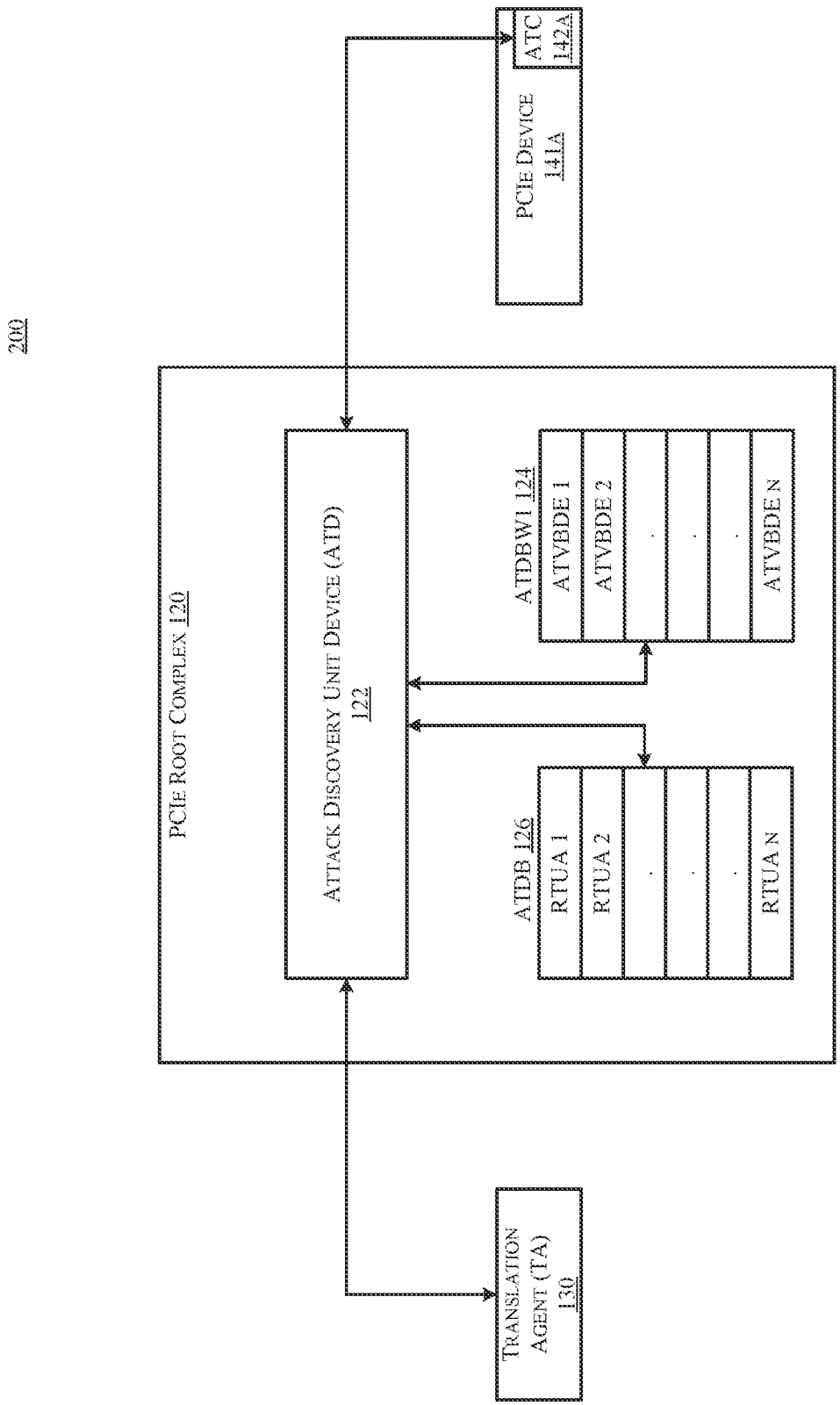
FIG. 3 is a block diagram illustrating components of a computing system architecture in which a method for detecting an ATS-based DMA attack may be implemented, in accordance with an embodiment.

FIG. 3 is a block diagram illustrating components of a computing system architecture in which a method for detecting an ATS-based DMA attack may be implemented, in accordance with an embodiment. Referring to FIG. 3, to address these and other issues, in some examples the PCIe root complex may be equipped with an attack discovery unit device (ATD) 122 that constructs and maintains two data files in memory and uses the two data files to detect an ATS-based direct memory attack initiated by setting the AT field to the second value.

Figure 4:
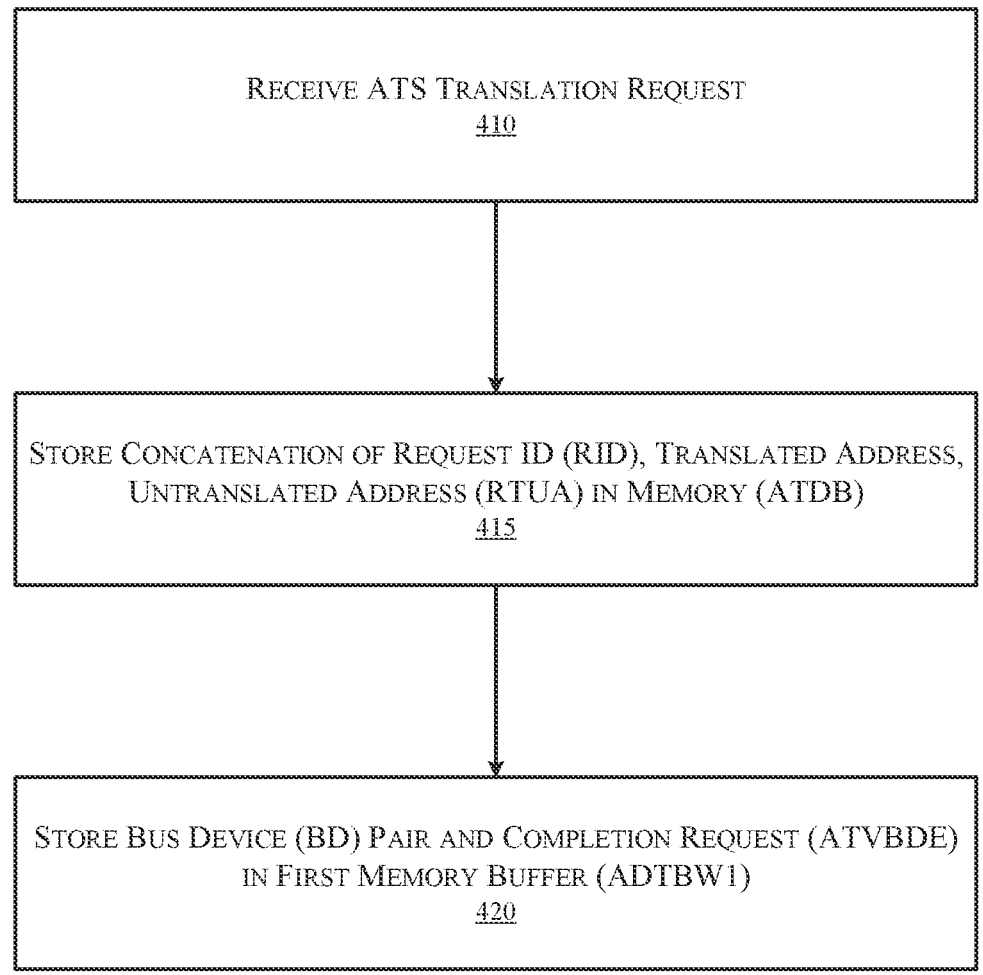
FIG. 4 is flowchart illustrating operations in a method for detecting an ATS-based DMA attack in accordance with an embodiment.

Referring to FIG. 3 and FIG. 4, a legitimate ATS operation begins with an ATS Translation Request originated by a PCIe device 141a and completes with an ATS Translation Response returned to the PCIe device 141a from the translation agent 130. The originator of the request (e.g., PCIe device 141a) is uniquely identified by the requester ID (RID), and both translated and untranslated addresses. In some examples, upon a condition in which the translation agent 130 authorizes a translation request, a success and translated address is returned to the requesting device identified by RID. This information, RTUA (concatenation of RID, the translated address and untranslated address) is stored in the ATDB (Address Type Detection Buffer) 126. In an alternative embodiment, a hash of the RTUA may be stored, rather than the entire RTUA. In addition, upon success condition, the attack discovery unit device 122 stores (operation 420) a bus device (BD) pair identifier associated with the PCIe device, referred to herein as an address translation verified bus device entry (ATDBVE), in a data table referred to herein as an address type detection buffer write once (ATDBW1) table 124. In an alternative embodiment, a hash of the ATDBVE may be stored, rather than the entire ATDBVE.

In operation, when completing a PCIe request with the address field set to "untranslated" the attack discovery unit device (ATD) 122 thus constructs the ATBDW1 table 124 and ATDB table 126 as ATS transaction requests are processed. The ATBDW1 table 124 and ATDB table 126 may be stored in a computer-readable memory communicatively coupled to the attack discovery unit 122, e.g., a cache memory or a memory buffer.

Figure 5:
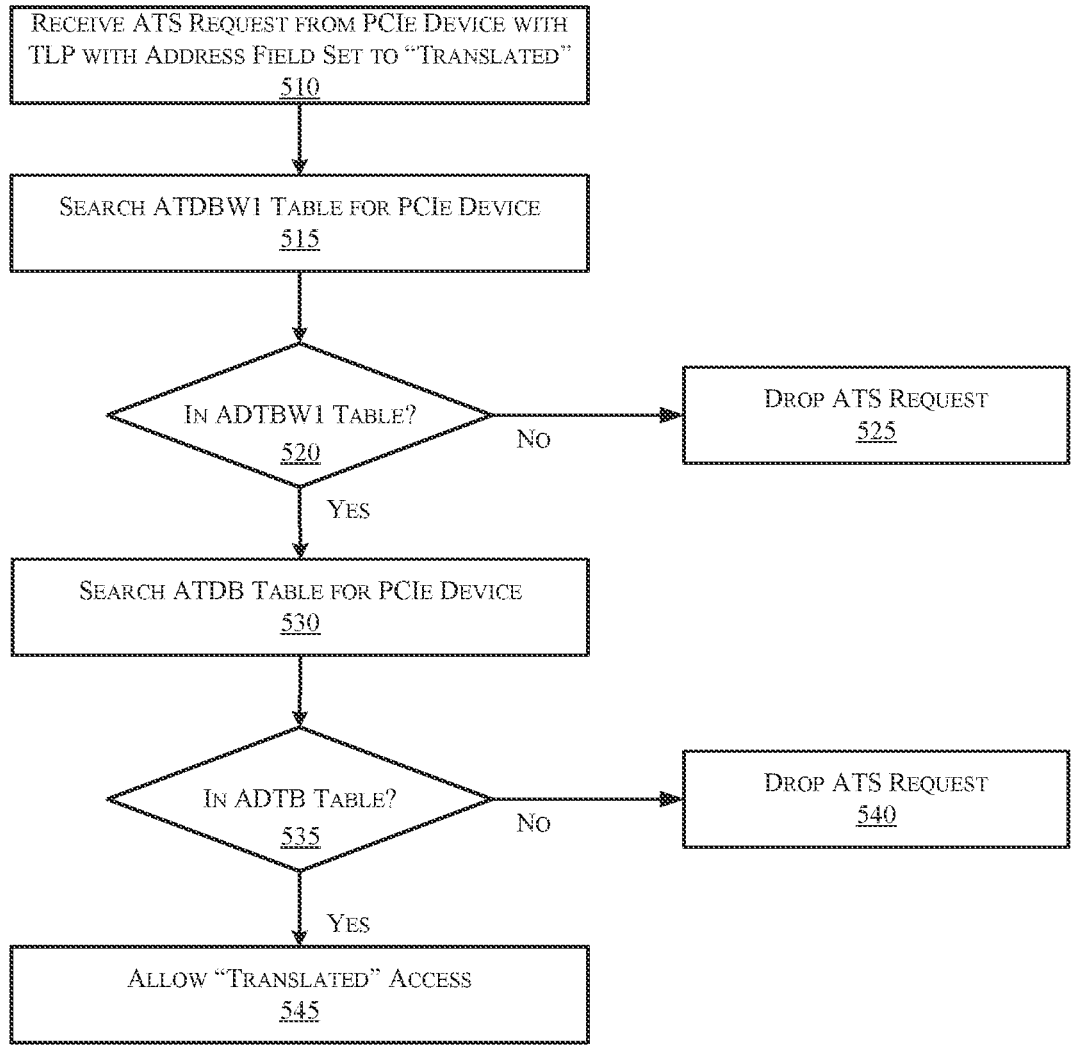
FIG. 5 is flowchart illustrating operations in a method for detecting an ATS-based DMA attack in accordance with an embodiment

In some examples, the attack discovery unit device (ATD) 122 uses the ATBDW1 table 124 and ATDB table 126 to implement a method for detecting an ATS-based DMA attack in accordance with an embodiment. FIG. 5 is flowchart illustrating operations in a method for detecting an ATS-based DMA attack in accordance with an embodiment. In some examples the operations depicted in FIG. 5 may be implemented by the attack discovery unit device 122. Referring to FIG. 5, at operation 510 the attack discovery unit device (ATD) 122 receives an ATS request from PCIe device 141a with a transport layer protocol (TLP) header which comprises an address translation (AT) field set to a value that indicates that the request has previous been translated by the translation agent 130, such that the request can proceed as a direct memory access (DMA) request.

At operation 515 the attack discovery unit device (ATD) 122 searches the address type detection buffer write once (ATDBW1) table 124 for an address translation verified bus device (ATVBDE) entry that matches the bus device pair in the ATS request. If, at operation 520 there is no matching address translation verified bus device (ATVBDE) entry in the address type detection buffer write once (ATDBW1) table 124 then the ATS request is dropped (operation 525). This operation catches the case in which a malicious device (i.e., a device that is not authorized to access memory 110) attempts a direct memory access to memory 110. By contrast, if at operation 520 there is a matching address translation verified bus device (ATVBDE) entry in the address type detection buffer write once (ATDBW1) table 124 then operation 530 is implemented.

At operation 530 the attack discovery unit device (ATD) 122 searches the address type detection buffer (ATDB) table 126 for an RTUA entry that matches the bus concatenation of the RID and the translated address included in the ATS completion message. If, at operation 535 there is no matching RTUA entry in the address type detection buffer (ATDB) table 126 then the ATS request is dropped (operation 540). This operation catches the case in which an authorized device makes a malicious attempt to access a portion of the memory 110 that the device is not authorized to access. By contrast, if at operation 535 there is a RTUA entry in the address type detection buffer (ATDB) table 124 then operation 545 is implemented and the ATS request is allowed to proceed as a direct memory access (DMA) request.

Exemplary Computing Architecture

Figure 6:
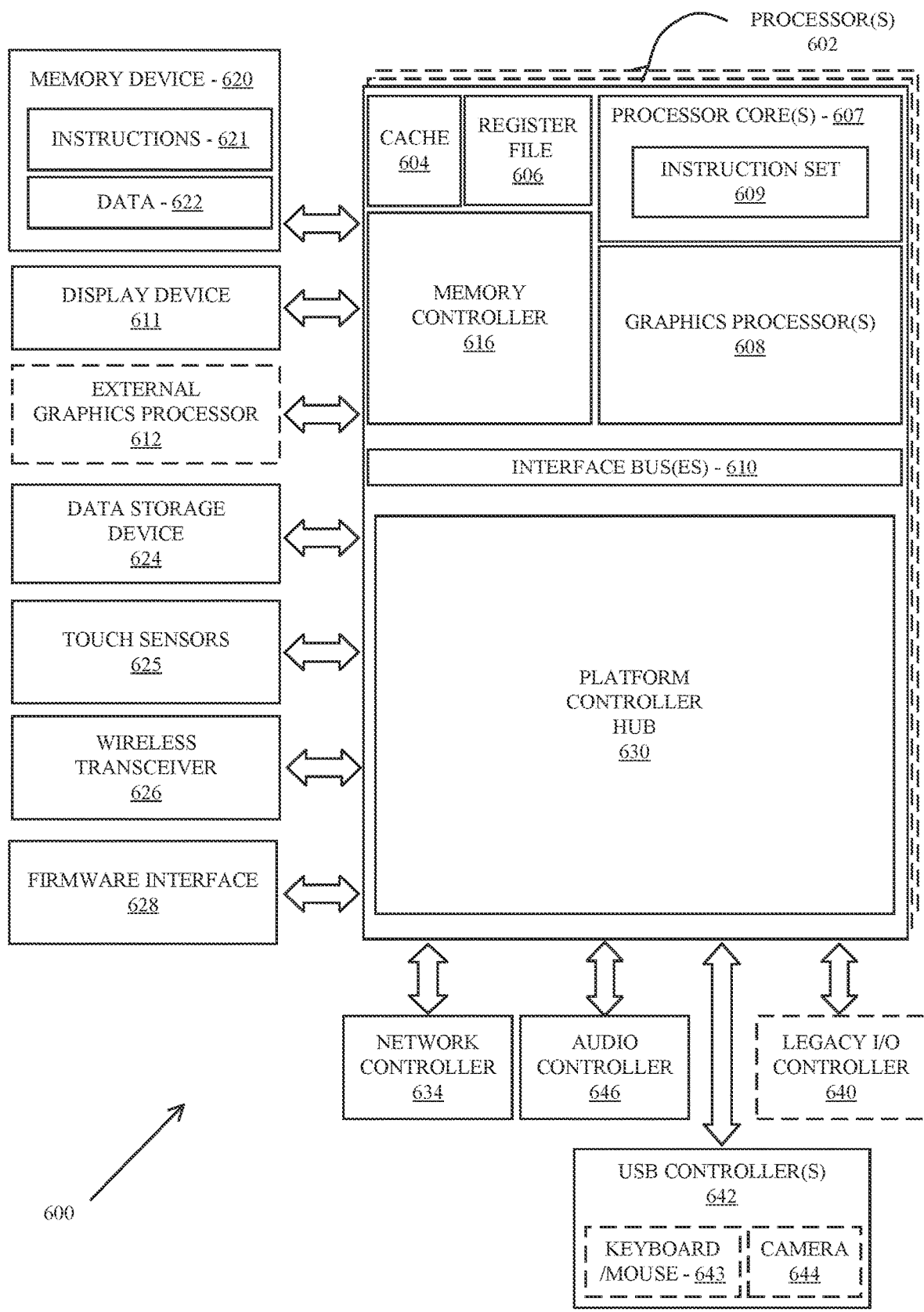
FIG. 6 is a block diagram illustrating a computing architecture which may be adapted to detect an ATS-based DMA attack in accordance with an embodiment in accordance with an embodiment.

FIG. 6 is a block diagram illustrating a computing architecture which may be adapted to detect an ATS-based DMA attack in accordance with an embodiment in accordance with an embodiment. In various embodiments, the computing architecture 600 may comprise or be implemented as part of an electronic device. In some embodiments, the computing architecture 600 may be representative, for example, of a computer system that implements one or more components of the operating environments described above. In some embodiments, computing architecture 600 may be representative of one or more portions or components in support of a secure address translation service that implements one or more techniques described herein.

As used in this application, the terms "system" and "component" and "module" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive or solid state drive (SSD), multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 includes one or more processors 602 and one or more graphics processors 608, and may be a single processor desktop system, a multiprocessor workstation system, or a server system having a large number of processors 602 or processor cores 607. In on embodiment, the system 600 is a processing platform incorporated within a system-on-a-chip (SoC or SOC) integrated circuit for use in mobile, handheld, or embedded devices.

An embodiment of system 600 can include, or be incorporated within, a server-based gaming platform, a game console, including a game and media console, a mobile gaming console, a handheld game console, or an online game console. In some embodiments system 600 is a mobile phone, smart phone, tablet computing device or mobile Internet device. Data processing system 600 can also include, couple with, or be integrated within a wearable device, such as a smart watch wearable device, smart eyewear device, augmented reality device, or virtual reality device. In some embodiments, data processing system 600 is a television or set top box device having one or more processors 602 and a graphical interface generated by one or more graphics processors 608.

In some embodiments, the one or more processors 602 each include one or more processor cores 607 to process instructions which, when executed, perform operations for system and user software. In some embodiments, each of the one or more processor cores 607 is configured to process a specific instruction set 609. In some embodiments, instruction set 609 may facilitate Complex Instruction Set Computing (CISC), Reduced Instruction Set Computing (RISC), or computing via a Very Long Instruction Word (VLIW). Multiple processor cores 607 may each process a different instruction set 609, which may include instructions to facilitate the emulation of other instruction sets. Processor core 607 may also include other processing devices, such a Digital Signal Processor (DSP).

In some embodiments, the processor 602 includes cache memory 604. Depending on the architecture, the processor 602 can have a single internal cache or multiple levels of internal cache. In some embodiments, the cache memory is shared among various components of the processor 602. In some embodiments, the processor 602 also uses an external cache (e.g., a Level-3 (L3) cache or Last Level Cache (LLC)) (not shown), which may be shared among processor cores 607 using known cache coherency techniques. A register file 606 is additionally included in processor 602 which may include different types of registers for storing different types of data (e.g., integer registers, floating point registers, status registers, and an instruction pointer register). Some registers may be general-purpose registers, while other registers may be specific to the design of the processor 602.

In some embodiments, one or more processor(s) 602 are coupled with one or more interface bus(es) 610 to transmit communication signals such as address, data, or control signals between processor 602 and other components in the system. The interface bus 610, in one embodiment, can be a processor bus, such as a version of the Direct Media Interface (DMI) bus. However, processor buses are not limited to the DMI bus, and may include one or more Peripheral Component Interconnect buses (e.g., PCI, PCI Express), memory buses, or other types of interface buses. In one embodiment the processor(s) 602 include an integrated memory controller 616 and a platform controller hub 630. The memory controller 616 facilitates communication between a memory device and other components of the system 600, while the platform controller hub (PCH) 630 provides connections to I/O devices via a local I/O bus.

Memory device 620 can be a dynamic random-access memory (DRAM) device, a static random-access memory (SRAM) device, flash memory device, phase-change memory device, or some other memory device having suitable performance to serve as process memory. In one embodiment the memory device 620 can operate as system memory for the system 600, to store data 622 and instructions 621 for use when the one or more processors 602 execute an application or process. Memory controller hub 616 also couples with an optional external graphics processor 612, which may communicate with the one or more graphics processors 608 in processors 602 to perform graphics and media operations. In some embodiments a display device 611 can connect to the processor(s) 602. The display device 611 can be one or more of an internal display device, as in a mobile electronic device or a laptop device or an external display device attached via a display interface (e.g., DisplayPort, etc.). In one embodiment the display device 611 can be a head mounted display (HMD) such as a stereoscopic display device for use in virtual reality (VR) applications or augmented reality (AR) applications.

In some embodiments the platform controller hub 630 enables peripherals to connect to memory device 620 and processor 602 via a high-speed I/O bus. The I/O peripherals include, but are not limited to, an audio controller 646, a network controller 634, a firmware interface 628, a wireless transceiver 626, touch sensors 625, a data storage device 624 (e.g., hard disk drive, flash memory, etc.). The data storage device 624 can connect via a storage interface (e.g., SATA) or via a peripheral bus, such as a Peripheral Component Interconnect bus (e.g., PCI, PCI Express). The touch sensors 625 can include touch screen sensors, pressure sensors, or fingerprint sensors. The wireless transceiver 626 can be a Wi-Fi transceiver, a Bluetooth transceiver, or a mobile network transceiver such as a 3G, 4G, Long Term Evolution (LTE), or 5G transceiver. The firmware interface 628 enables communication with system firmware, and can be, for example, a unified extensible firmware interface (UEFI). The network controller 634 can enable a network connection to a wired network. In some embodiments, a high-performance network controller (not shown) couples with the interface bus 610. The audio controller 646, in one embodiment, is a multi-channel high definition audio controller. In one embodiment the system 600 includes an optional legacy I/O controller 640 for coupling legacy (e.g., Personal System 2 (PS/2)) devices to the system. The platform controller hub 630 can also connect to one or more Universal Serial Bus (USB) controllers 642 connect input devices, such as keyboard and mouse 643 combinations, a camera 644, or other USB input devices.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Example 1 is an apparatus supporting secure address translation services, the system comprising a computer-readable memory for storage of data, the computer-readable memory comprising a first memory buffer and a second memory buffer; an attack discovery unit device comprising processing circuitry to perform operations, comprising receiving a direct memory access (DMA) request from a remote device via a Peripheral Component Interconnect Express (PCIe) link, the direct memory access (DMA) request comprising a host physical address and a header indicating that the target memory address has previously been translated to a host physical address (HPA); and blocking a direct memory access in response to a determination of at least one of that the remote device has not obtained a valid address translation from a translation agent; or that the remote device has not obtained a valid translation for the target memory address from the translation agent.

Example 2 includes the subject matter of Example 1, wherein the attack discovery unit device comprises processing circuitry to perform operations, comprising receiving, from the translation agent, a translation response; and storing, in the first memory buffer, at least a portion of a completion request from the translation agent.

Example 3 includes the subject matter of Examples 1-2, wherein the portion of the completion request from the translation agent comprises a bus device pair identifier associated with the remote device.

Example 4 includes the subject matter of Examples 1-3, further comprising circuitry to search the first memory buffer in response to a direct memory access request to determine that the remote device has not obtained a valid address translation from the translation agent.

Example 5 includes the subject matter of Examples 1-4, wherein the attack discovery unit device comprises processing circuitry to perform operations, comprising receiving, from the translation agent, a translation response; and storing, in the second memory buffer, at least a portion of the translation response the translation agent.

Example 6 includes the subject matter of Examples 1-5, wherein the portion of the completion request from the translation agent comprises a requester identifier (RID), a translated address, and an untranslated address.

Example 7 includes the subject matter of Examples 1-6 further comprising searching the second memory buffer in response to a direct memory access request to determine that the remote device has not obtained a valid address translation for the target memory address from the translation agent.

Example 8 is a computer-implemented method, comprising receiving, in an attack discovery unit device, a direct memory access (DMA) request from a remote device via a Peripheral Component Interconnect Express (PCIe) link, the direct memory access (DMA) request comprising a host physical address and a header indicating that the target memory address has previously been translated to a host physical address (HPA); and blocking a direct memory access in response to a determination of at least one of that the remote device has not obtained a valid address translation from a translation agent; or that the remote device has not obtained a valid translation for the target memory address from the translation agent.

Example 9 includes the subject matter of Example 8, wherein the attack discovery unit device comprises processing circuitry to perform operations, comprising receiving, from the translation agent, a translation response; and storing, in the first memory buffer, at least a portion of a completion request from the translation agent.

Example 10 includes the subject matter of Examples 8-9 wherein the portion of the completion request from the translation agent comprises a bus device pair identifier associated with the remote device.

Example 11 includes the subject matter of Examples 8-10, further comprising searching the first memory buffer in response to a direct memory access request to determine that the remote device has not obtained a valid address translation from the translation agent.

Example 12 includes the subject matter of Examples 8-11, further comprising receiving, from the translation agent, a translation response; and storing, in the second memory buffer, at least a portion of the translation response the translation agent.

Example 13 includes the subject matter of Examples 8-12, wherein the portion of the completion request from the translation agent comprises a requester identifier (RID), a translated address, and an untranslated address.

Example 14 includes the subject matter of Examples 8-13, further comprising searching the second memory buffer in response to a direct memory access request to determine that the remote device has not obtained a valid address translation for the target memory address from the translation agent.

Example 15 is a non-transitory computer readable medium comprising instructions which, when executed by a processor, configure the processor to perform operations comprising receiving, in an attack discovery unit device, a direct memory access (DMA) request from a remote device via a Peripheral Component Interconnect Express (PCIe) link, the direct memory access (DMA) request comprising a host physical address and a header indicating that the target memory address has previously been translated to a host physical address (HPA); and blocking a direct memory access in response to a determination of at least one of that the remote device has not obtained a valid address translation from a translation agent; or that the remote device has not obtained a valid translation for the target memory address from the translation agent.

Example 16 includes the subject matter Example 15, wherein the attack discovery unit device comprises processing circuitry to perform operations, comprising receiving, from the translation agent, a translation response; and storing, in the first memory buffer, at least a portion of a completion request from the translation agent.

Example 17 includes the subject matter of Examples 15-16, wherein the portion of the completion request from the translation agent comprises a bus device pair identifier associated with the remote device.

Example 18 includes the subject matter of Examples 15-17, further comprising instructions which, when executed by the processor, configure the processor to perform operations comprising further comprising searching the first memory buffer in response to a direct memory access request to determine that the remote device has not obtained a valid address translation from the translation agent.

Example 19 includes the subject matter of Examples 15-18, further comprising instructions which, when executed by the processor, configure the processor to perform operations comprising receiving, from the translation agent, a translation response; and storing, in the second memory buffer, at least a portion of the translation response the translation agent Example 20 includes the subject matter of Examples 15-19, wherein the portion of the completion request from the translation agent comprises a requester identifier (RID), a translated address, and an untranslated address.

Example 21 includes the subject matter of Examples 15-20, further comprising further comprising instructions which, when executed by the processor, configure the processor to perform operations comprising searching the second memory buffer in response to a direct memory access request to determine that the remote device has not obtained a valid address translation for the target memory address from the translation agent.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. An apparatus comprising:
    a computer-readable memory for storage of data, the computer-readable memory comprising a first memory buffer and a second memory buffer;
    an attack discovery unit device comprising processing circuitry to perform operations, comprising:
        receiving a direct memory access (DMA) request from a remote device via a Peripheral Component Interconnect Express (PCIe) link, the direct memory access (DMA) request comprising a host physical address and a header indicating that the target memory address has previously been translated to a host physical address (HPA);
        searching a first memory table for an address translation verified bus device (ATVBDE) entry that matches a bus device pair associated with the PCIe link and a second memory table for an entry that matches a bus concatenation of a requester ID (RID) and a translated address included in an Address Translation Services (ATS) completion message; and
        blocking a direct memory access in response to a determination of at least one of: that the remote device has not obtained a valid address translation from a translation agent; or that the remote device has not obtained a valid translation for the target memory address from the translation agent.

2. The apparatus of claim 1, wherein the attack discovery unit device comprises processing circuitry to perform operations, comprising:
receiving, from the translation agent, a translation response; and
storing, in the first memory buffer, at least a portion of a completion request from the translation agent.

3. The apparatus of claim 2, wherein the portion of the completion request from the translation agent comprises a bus device pair identifier associated with the remote device.

4. The apparatus of claim 3, further comprising searching the first memory buffer in response to a direct memory access request to determine that the remote device has not obtained a valid address translation from the translation agent.

5. The apparatus of claim 1, wherein the attack discovery unit device comprises processing circuitry to perform operations, comprising:
receiving, from the translation agent, a translation response; and
storing, in the second memory buffer, at least a portion of the translation response the translation agent.

6. The apparatus of claim 5, wherein the portion of the completion request from the translation agent comprises the requester ID, the translated address, and an untranslated address.

7. The apparatus of claim 6, further comprising searching the second memory buffer in response to a direct memory access request to determine that the remote device has not obtained a valid address translation for the target memory address from the translation agent.

8. A computer-implemented method, comprising:
receiving, in an attack discovery unit device, a direct memory access (DMA) request from a remote device via a Peripheral Component Interconnect Express (PCIe) link, the direct memory access (DMA) request comprising a host physical address and a header indicating that the target memory address has previously been translated to a host physical address (HPA);
searching a first memory table for an address translation verified bus device (ATVBDE) entry that matches a bus device pair associated with the PCIe link and a second memory table for an entry that matches a bus concatenation of a requester ID (RID) and a translated address included in an Address Translation Services (ATS) completion message; and
blocking a direct memory access in response to a determination of at least one of: that the remote device has not obtained a valid address translation from a translation agent; or that the remote device has not obtained a valid translation for the target memory address from the translation agent.

9. The method of claim 8, further comprising:
receiving, from the translation agent, a translation response; and
storing, in a first memory buffer, at least a portion of a completion request from the translation agent.

10. The method of claim 9, wherein the portion of the completion request from the translation agent comprises a bus device pair identifier associated with the remote device.

11. The method of claim 10, further comprising searching the first memory buffer in response to a direct memory access request to determine that the remote device has not obtained a valid address translation from the translation agent.

12. The method of claim 8, further comprising:
receiving, from the translation agent, a translation response; and
storing, in the second memory buffer, at least a portion of the translation response the translation agent.

13. The method of claim 12, wherein the portion of the completion request from the translation agent comprises the requester ID, the translated address, and an untranslated address.

14. The method of claim 8, further comprising searching the second memory buffer in response to a direct memory access request to determine that the remote device has not obtained a valid address translation for the target memory address from the translation agent.

15. A non-transitory computer readable medium comprising instructions which, when executed by a processor, configure the processor to perform operations comprising:
receiving, in an attack discovery unit device, a direct memory access (DMA) request from a remote device via a Peripheral Component Interconnect Express (PCIe) link, the direct memory access (DMA) request comprising a host physical address and a header indicating that the target memory address has previously been translated to a host physical address (HPA);
searching a first memory table for an address translation verified bus device (ATVBDE) entry that matches a bus device pair associated with the PCIe link and a second memory table for an entry that matches a bus concatenation of a requester ID (RID) and a translated address included in an Address Translation Services (ATS) completion message; and blocking a direct memory access in response to a determination of at least one of: that the remote device has not obtained a valid address translation from a translation agent; or that the remote device has not obtained a valid translation for the target memory address from the translation agent.

16. The non-transitory computer readable medium of claim 15, further comprising instructions which, when executed by the processor, configure the processor to perform operations comprising:
receiving, from the translation agent, a translation response; and
storing, in a first memory buffer, at least a portion of a completion request from the translation agent.

17. The non-transitory computer readable medium of claim 16, wherein the portion of the completion request from the translation agent comprises a bus device pair identifier associated with the remote device.

18. The non-transitory computer readable medium of claim 17, further comprising instructions which, when executed by the processor, configure the processor to perform operations comprising:
searching the first memory buffer in response to a direct memory access request to determine that the remote device has not obtained a valid address translation from the translation agent.

19. The non-transitory computer readable medium of claim 15, further comprising instructions which, when executed by the processor, configure the processor to perform operations comprising
receiving, from the translation agent, a translation response; and
storing, in the second memory buffer, at least a portion of the translation response the translation agent.

20. The non-transitory computer readable medium of claim 19, wherein the portion of the completion request from the translation agent comprises the requester ID, the translated address, and an untranslated address.

21. The non-transitory computer readable medium of claim 20, further comprising instructions which, when executed by the processor, configure the processor to perform operations comprising:
  searching the second memory buffer in response to a direct memory access request to determine that the remote device has not obtained a valid address translation for the target memory address from the translation agent.

* * * * *